United States Patent [19]
Wambold, Jr. et al.

[11] Patent Number: 5,924,211
[45] Date of Patent: Jul. 20, 1999

[54] VARIABLE POWER RIFLE SCOPE ADJUSTER

[76] Inventors: Russell W. Wambold, Jr.; Cheryl E. Wambold, both of 883 W. Baltimore Pike, West Grove, Pa. 19390

[21] Appl. No.: 08/992,559

[22] Filed: Dec. 17, 1997

[51] Int. Cl.[6] .............. F41G 1/38; G02B 15/14
[52] U.S. Cl. .............. 33/246; 42/101; 359/694
[58] Field of Search .......... 42/101, 100; 33/246, 33/245

[56] References Cited

U.S. PATENT DOCUMENTS

| | | | |
|---|---|---|---|
| 1,950,790 | 3/1934 | Fahrenwald | 33/246 |
| 2,449,551 | 9/1948 | Garand | 42/101 |
| 3,434,213 | 3/1969 | Lauder | 33/246 |
| 4,618,221 | 10/1986 | Thomas | 350/566 |
| 5,276,554 | 1/1994 | Nassivera | 33/246 |
| 5,388,005 | 2/1995 | Wilson | 33/246 |
| 5,513,440 | 5/1996 | Murg | 33/246 |
| 5,521,757 | 5/1996 | Olson | 33/246 |
| 5,528,847 | 6/1996 | Fisher et al. | 42/101 |
| 5,771,595 | 6/1998 | Bell | 33/246 |

*Primary Examiner*—Charles T. Jordan
*Assistant Examiner*—Denise J. Buckley

[57] ABSTRACT

A new variable power rifle scope adjuster for allowing a variable power rifle scope to be adjusted with a single finger. The inventive device includes a clamping ring dimensioned for fitting around a power adjustment ring on a standard scope. A vertical segment is secured to and extends upwardly from the clamping ring. A horizontal segment extends outwardly from an upper end of the vertical segment. A finger loop is secured to a free end of the horizontal segment. The finger loop is dimensioned for receiving a finger therein for moving the vertical segment and the horizontal segment to facilitate movement of the clamping rod to adjust the power adjustment ring on the standard scope.

12 Claims, 4 Drawing Sheets

VARIABLE POWER RIFLE SCOPE ADJUSTER

BACKGROUND OF THE INVENTION

1. Field of the Invention

The present invention relates to adjustable variable scopes and more particularly pertains to a new variable power rifle scope adjuster for allowing a variable power rifle scope to be adjusted with a single finger.

2. Description of the Prior Art

The use of adjustable variable scopes is known in the prior art. More specifically, adjustable variable scopes heretofore devised and utilized are known to consist basically of familiar, expected and obvious structural configurations, notwithstanding the myriad of designs encompassed by the crowded prior art which have been developed for the fulfillment of countless objectives and requirements.

Known prior art adjustable variable scopes include U.S. Pat. No. 5,276,554 to Nassivera; U.S. Pat. No. 5,180,875 to Berry, Jr. et al.; U.S. Pat. No. 4,952,041 to Sandall; U.S. Pat. No. 3,910,700 to Sprandel; U.S. Pat. No. 3,948,587 to Rubbert; and U.S. Pat. No. Des. 346,392 to Tomita.

While these devices fulfill their respective, particular objectives and requirements, the aforementioned patents do not disclose a new variable power rifle scope adjuster. The inventive device includes a clamping ring dimensioned for fitting around a power adjustment ring on a standard scope. A vertical segment is secured to and extends upwardly from the clamping ring. A horizontal segment extends outwardly from an upper end of the vertical segment. A finger loop is secured to a free end of the horizontal segment. The finger loop is dimensioned for receiving a finger therein for moving the vertical segment and the horizontal segment to facilitate movement of the clamping rod to adjust the power adjustment ring on the standard scope.

In these respects, the variable power rifle scope adjuster according to the present invention substantially departs from the conventional concepts and designs of the prior art, and in so doing provides an apparatus primarily developed for the purpose of allowing a variable power rifle scope to be adjusted with a single finger.

SUMMARY OF THE INVENTION

In view of the foregoing disadvantages inherent in the known types of adjustable variable scopes now present in the prior art, the present invention provides a new variable power rifle scope adjuster construction wherein the same can be utilized for allowing a variable power rifle scope to be adjusted with a single finger.

The general purpose of the present invention, which will be described subsequently in greater detail, is to provide a new variable power rifle scope adjuster apparatus and method which has many of the advantages of the adjustable variable scopes mentioned heretofore and many novel features that result in a new variable power rifle scope adjuster which is not anticipated, rendered obvious, suggested, or even implied by any of the prior art adjustable variable scopes, either alone or in any combination thereof.

To attain this, the present invention generally comprises a clamping ring dimensioned for fitting around a power adjustment ring on a standard scope. A vertical segment is secured to and extends upwardly from the clamping ring. A horizontal segment extends outwardly from an upper end of the vertical segment. A finger loop is secured to a free end of the horizontal segment. The finger loop is dimensioned for receiving a finger therein for moving the vertical segment and the horizontal segment to facilitate movement of the clamping rod to adjust the power adjustment ring on the standard scope.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new variable power rifle scope adjuster apparatus and method which has many of the advantages of the adjustable variable scopes mentioned heretofore and many novel features that result in a new variable power rifle scope adjuster which is not anticipated, rendered obvious, suggested, or even implied by any of the prior art adjustable variable scopes, either alone or in any combination thereof.

It is another object of the present invention to provide a new variable power rifle scope adjuster which may be easily and efficiently manufactured and marketed.

It is a further object of the present invention to provide a new variable power rifle scope adjuster which is of a durable and reliable construction.

An even further object of the present invention is to provide a new variable power rifle scope adjuster which is susceptible of a low cost of manufacture with regard to both materials and labor, and which accordingly is then susceptible of low prices of sale to the consuming public, thereby making such variable power rifle scope adjuster economically available to the buying public.

Still yet another object of the present invention is to provide a new variable power rifle scope adjuster which provides in the apparatuses and methods of the prior art some of the advantages thereof, while simultaneously overcoming some of the disadvantages normally associated therewith.

Still another object of the present invention is to provide a new variable power rifle scope adjuster for allowing a variable power rifle scope to be adjusted with a single finger.

Yet another object of the present invention is to provide a new variable power rifle scope adjuster which includes a clamping ring dimensioned for fitting around a power adjustment ring on a standard scope. A vertical segment is secured to and extends upwardly from the clamping ring. A horizontal segment extends outwardly from an upper end of the vertical segment. A finger loop is secured to a free end of the horizontal segment. The finger loop is dimensioned for receiving a finger therein for moving the vertical segment and the horizontal segment to facilitate movement of the clamping rod to adjust the power adjustment ring on the standard scope.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
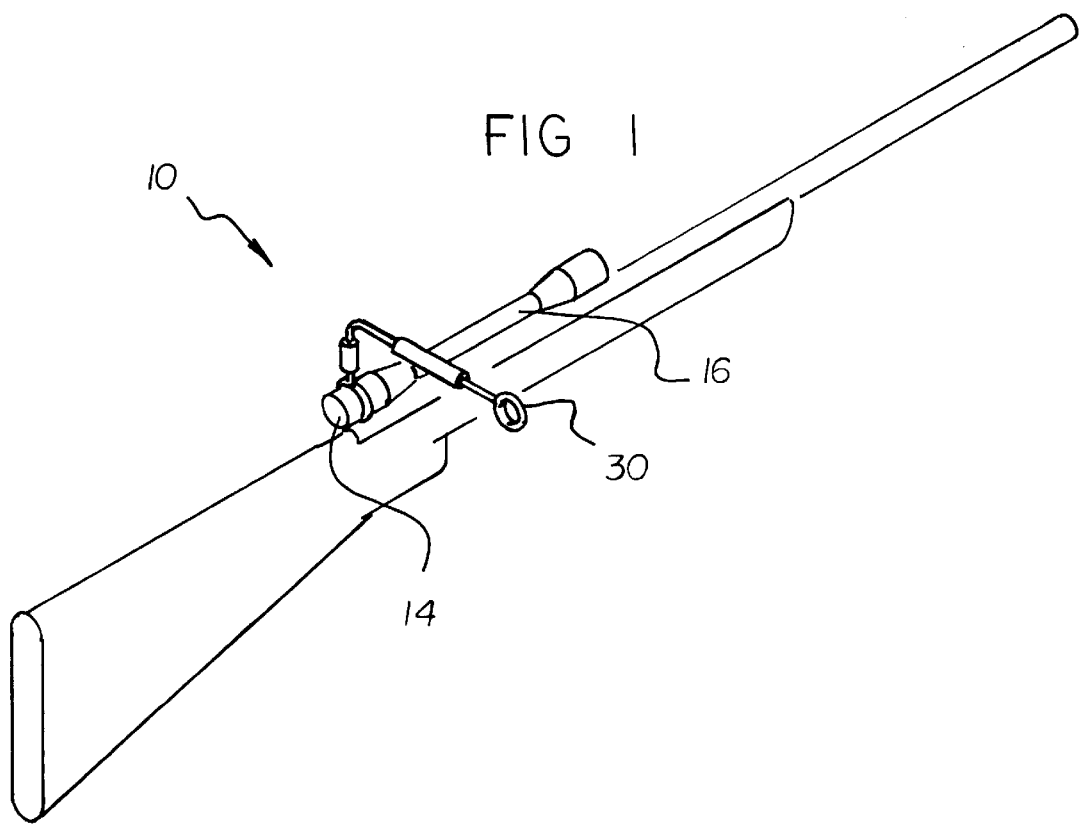
FIG. 1 is a perspective view of a new variable power rifle scope adjuster according to the present invention illustrated in use.
Figure 2:
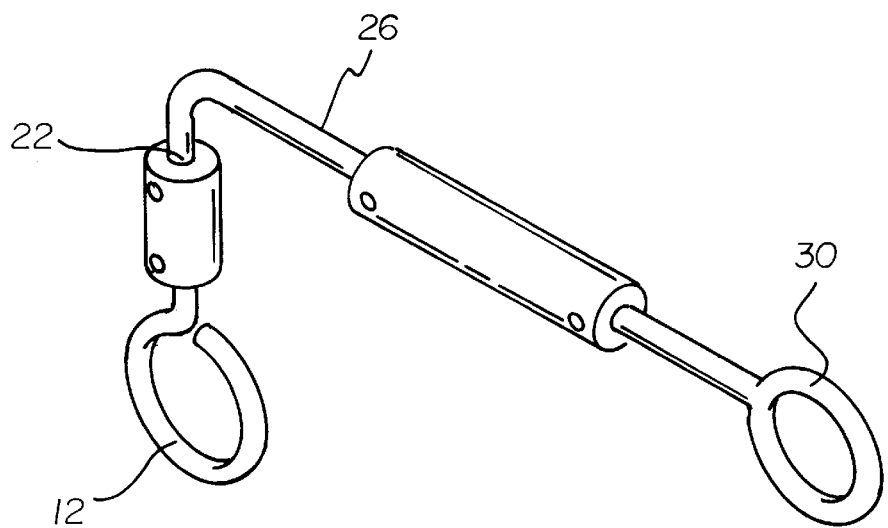
FIG. 2 is a perspective view of the preferred embodiment of the present invention.

With reference now to the drawings, and in particular to FIGS. 1 through 6 thereof, a new variable power rifle scope adjuster embodying the principles and concepts of the present invention and generally designated by the reference numeral 10 will be described.

Figure 3:
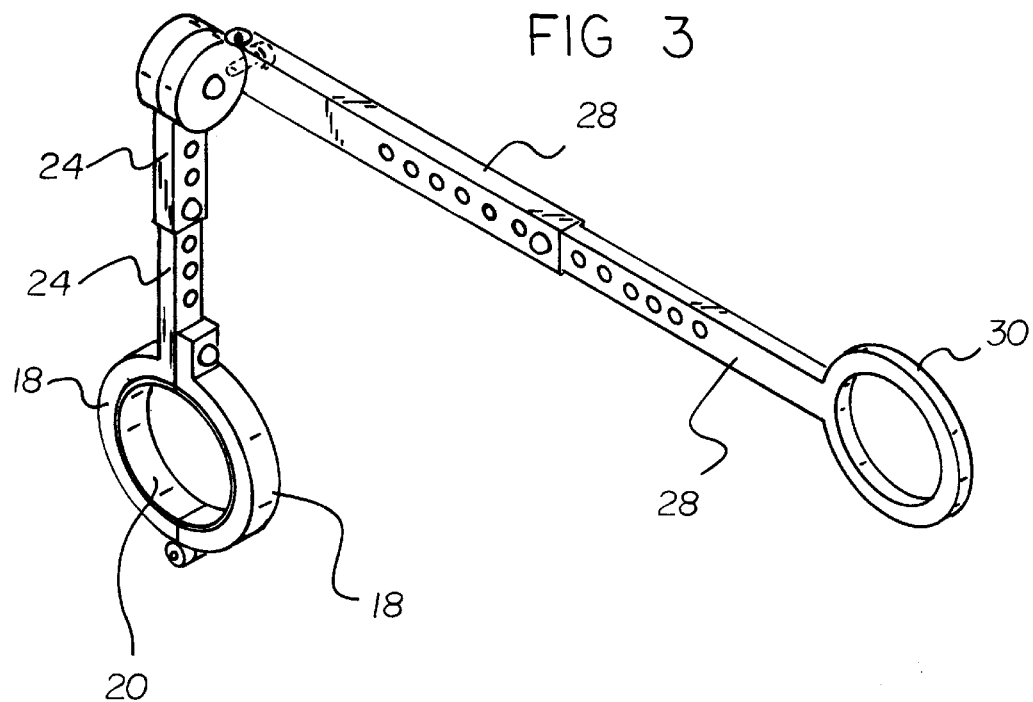
FIG. 3 is a perspective view of a second embodiment of the present invention.
Figure 4:
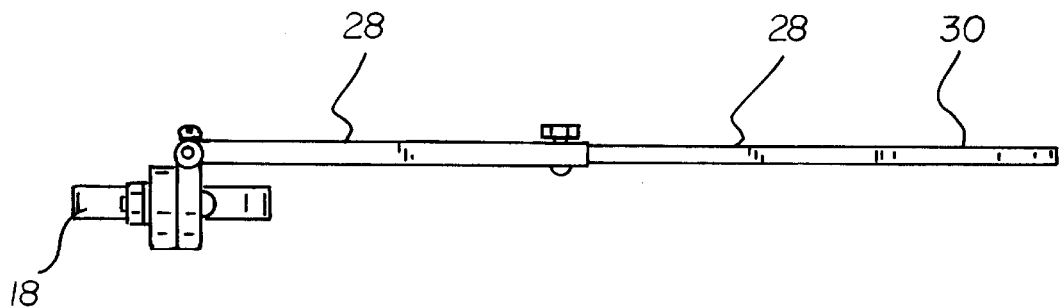
FIG. 4 is a plan view of the second embodiment of the present invention.

As best illustrated in FIGS. 1 through 6, the variable power rifle scope adjuster 10 comprises a clamping ring 12 dimensioned for fitting around a power adjustment ring 14 on a standard scope 16. In an alternate embodiment, as illustrated in FIG. 3, the clamping ring 12 is comprised of a pair of semi-circular portions 18 pivotally coupled together at corresponding free ends thereof. The pair of semi-circular portions 18 each have a rubber layer 20 disposed on an interior surface thereof. The rubber layers 20 facilitate securement to the power adjustment ring 14.

A vertical segment 22 is secured to and extends upwardly from the clamping ring 12. In the alternate embodiment, the vertical segment 22 is length adjustable (Note FIGS. 3 and 4). The vertical segment 22 is comprised of a pair of telescoping portions 24 with aligning apertures and a retaining pin.

A horizontal segment 26 extends outwardly from an upper end of the vertical segment 22. In the alternate embodiment, the horizontal segment 26 is length adjustable (Note FIGS. 3 and 4). The horizontal segment 26 is comprised of a pair of telescoping portions 28 with aligning apertures and a retaining pin. In the alternate embodiment, the horizontal segment 26 is pivotally coupled with the vertical segment 22 to facilitate further adjustment.

A finger loop 30 is secured to a free end of the horizontal segment 26. The finger loop 30 is dimensioned for receiving a finger therein for moving the vertical segment 22 and the horizontal segment 26 to facilitate movement of the clamping ring 12 to adjust the power adjustment ring 14 on the standard scope 16.

Figure 5:
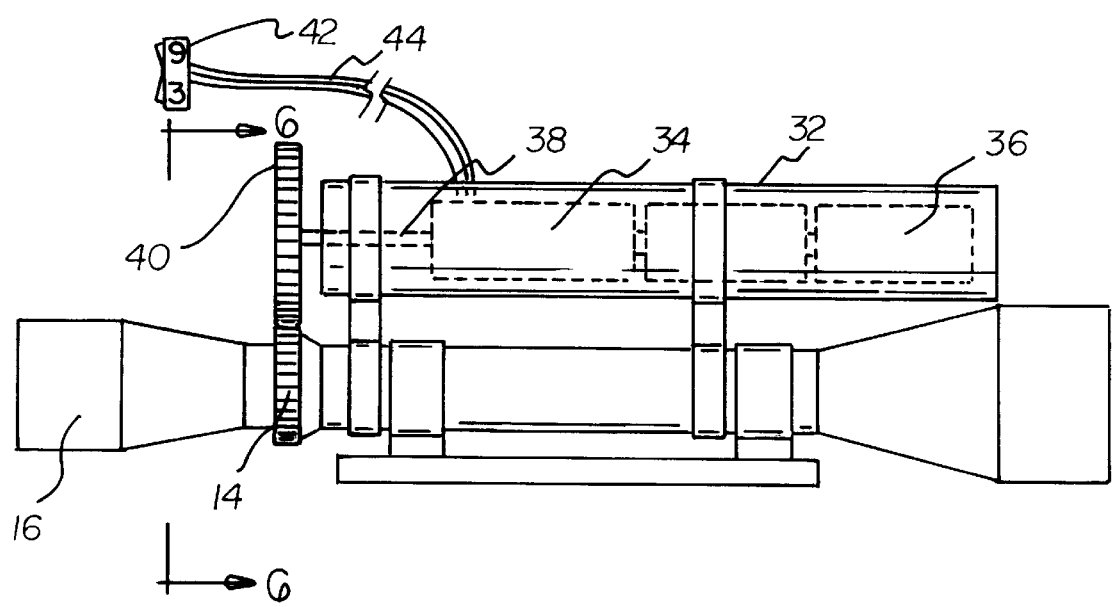
FIG. 5 is a side view of a third embodiment of the present invention.
Figure 6:
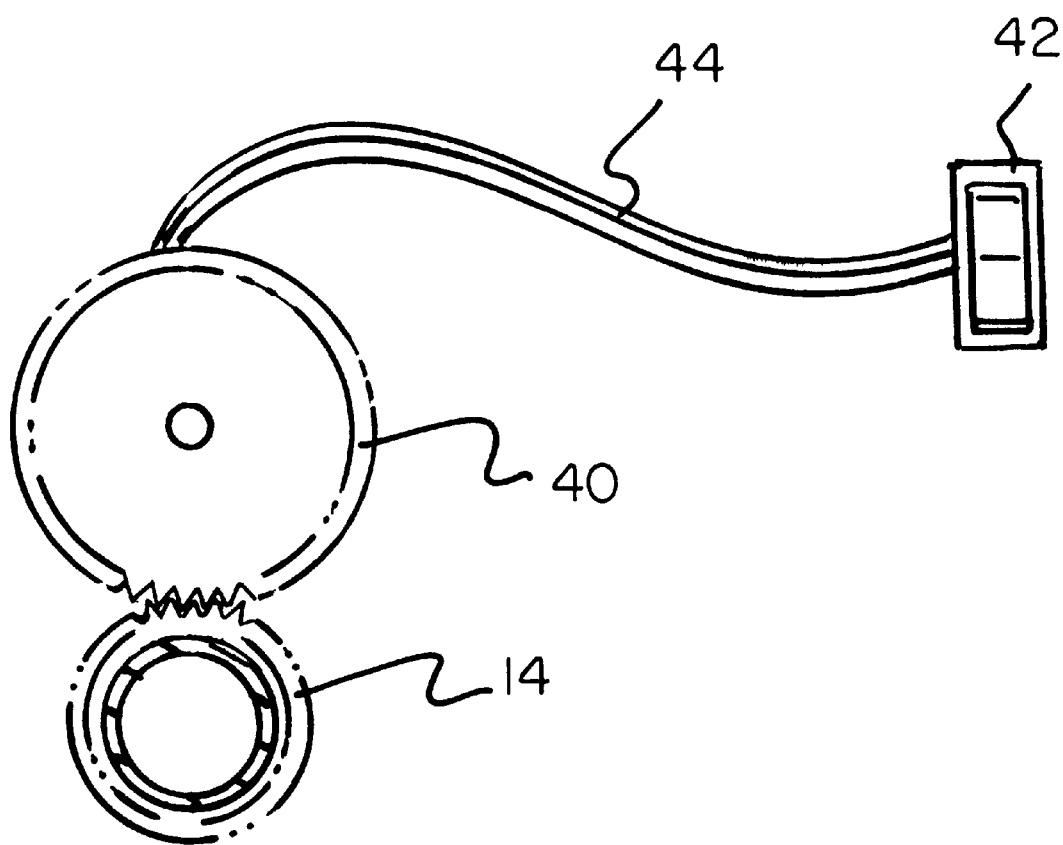
FIG. 6 is a cross-sectional view of the present invention as taken along line 6—6 of FIG. 5.

In a third embodiment, as illustrated in FIGS. 5 and 6, a cylindrical housing 32 is securable on a top surface of the standard scope 16 of a rifle. The cylindrical housing 32 has a motor 34 disposed in a back end thereof. A plurality of batteries 36 are disposed in a forward end of the cylindrical housing 32 in communication with the motor 34. The motor 34 has a rotating shaft 38 extending outwardly of the back end of the cylindrical housing 32. A free end of the shaft 38 has a gear 40 disposed thereon. The gear has a knurled peripheral edge. The knurled peripheral edge of the gear 40 meshes with peripheral teeth of the power adjustment ring 14 of the standard scope 16.

The third embodiment further includes a control switch 42 having a wire 44 extending inwardly of the cylindrical housing 32 and coupling with the motor 34. The control switch 42 facilitates increasing and decreasing the power adjustment ring 14. The control switch 42 is securable to the rifle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A variable power rifle scope adjuster for allowing a variable power rifle scope to be adjusted with a single finger comprising, in combination:

a clamping ring dimensioned for fitting around a power adjustment ring on a standard scope;

a vertical segment secured directly to and extending upwardly from the clamping ring;

a horizontal segment extending outwardly from an upper end of the vertical segment in a direction away from the scope; and a finger loop secured to a free end of the horizontal segment, the finger loop being dimensioned for receiving a finger therein for moving the vertical segment and the horizontal segment to facilitate movement of the clamping ring to adjust the power adjustment ring on the standard scope.

2. The variable power rifle scope adjuster as set forth in claim 1 wherein the clamping ring is comprised of a pair of semi-circular portions pivotally coupled together at corresponding free ends thereof.

3. The variable power rifle scope adjuster as set forth in claim 2 wherein the pair of semi-circular portions each have a rubber layer disposed on an interior surface thereof.

4. The variable power rifle scope adjuster as set forth in claim 3 wherein the vertical segment is length adjustable.

5. The variable power rifle scope adjuster as set forth in claim 4 wherein the horizontal segment is length adjustable.

6. The variable power rifle scope adjuster as set forth in claim 5 wherein the horizontal segment is pivotally coupled with the vertical segment.

7. The variable power rifle scope adjuster as set forth in claim 1 wherein the horizontal segment is pivotally coupled with the vertical segment, the horizontal segment being pivotable about an upper end of the vertical segment parallel a plane extending along a longitudinal axis of the vertical segment.

8. The variable power rifle scope adjuster as set forth in claim 1 wherein the horizontal segment is pivotally coupled with the vertical segment, the horizontal segment being pivotal along a plane extending substantially perpendicular to the longitudinal axis of the vertical segment.

9. The variable power rifle scope adjuster as set forth in claim 1 wherein the horizontal segment is length adjustable, the horizontal segment comprising an outer telescoping portion and an inner telescoping portion being slidably received in the outer telescoping portions, each of the telescoping portions having a plurality of apertures extending therethrough, the apertures being alignable, a retaining pin extending through the apertures.

10. The variable power rifle scope adjuster as set forth in claim 1 wherein the vertical segment is length adjustable, the vertical segment comprising an outer telescoping portion and an inner telescoping portion being slidably received in the outer telescoping portions, each of the telescoping portions having a plurality of apertures extending therethrough, the apertures being alignable, a retaining pin extending through the apertures.

11. The variable power rifle scope adjuster as set forth in claim 10 wherein the horizontal segment is length adjustable, the horizontal segment comprising an outer telescoping portion and an inner telescoping portion being slidably received in the outer telescoping portions, each of the telescoping portions having a plurality of apertures extending therethrough, the apertures being alignable, a retaining pin extending through the apertures.

12. A variable power rifle scope system for allowing a variable power rifle scope to be adjusted with a single finger comprising, in combination:

a clamping ring dimensioned for fitting around a power adjustment ring on a standard scope;

a vertical segment secured to and extending upwardly from the clamping ring;

a horizontal segment extending outwardly from an upper end of the vertical segment in a direction away from the scope;

a finger loop secured to a free end of the horizontal segment, the finger loop being dimensioned for receiving a finger therein for moving the vertical segment and the horizontal segment to facilitate movement of the clamping ring to adjust the power adjustment ring on the standard scope;

the clamping ring comprising a pair of semi-circular portions pivotally coupled together at corresponding free ends thereof;

wherein the pair of semi-circular portions each have a rubber layer disposed on an interior surface thereof;

wherein the horizontal segment is pivotally coupled with the vertical segment, the horizontal segment being pivotable about an upper end of the vertical segment parallel a plane extending along a longitudinal axis of the vertical segment;

wherein the horizontal segment is pivotal along a plane extending substantially perpendicular to the longitudinal axis of the vertical segment;

wherein the vertical segment is length adjustable, the vertical segment comprising an outer telescoping portion and an inner telescoping portion being slidably received in the outer telescoping portions, each of the telescoping portions having a plurality of apertures extending therethrough, the apertures being alignable, a retaining pin extending through the apertures;

wherein the horizontal segment is length adjustable, the horizontal segment comprising an outer telescoping portion and an inner telescoping portion being slidably received in the outer telescoping portions, each of the telescoping portions having a plurality of apertures extending therethrough, the apertures being alignable, a retaining pin extending through the apertures.

* * * * *